Patented Nov. 9, 1926.

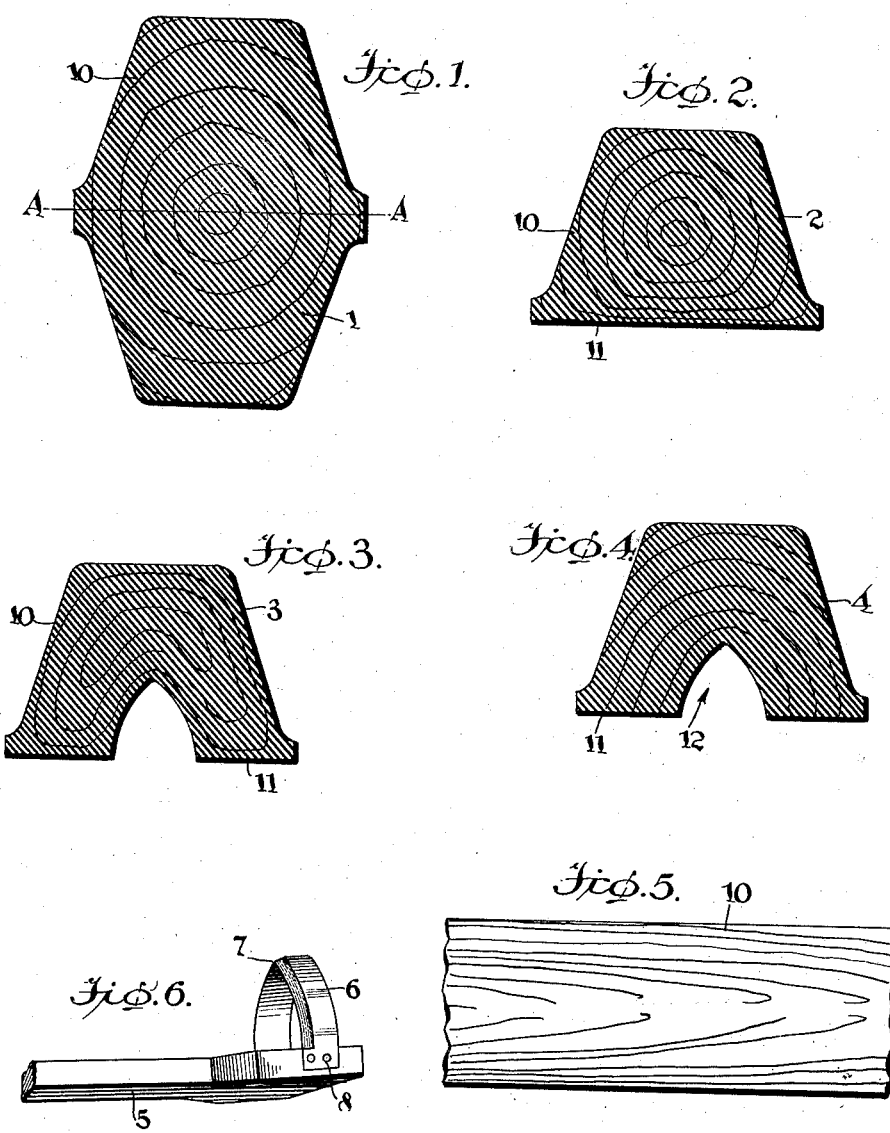

1,606,503

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

CUSHION TIRE AND METHOD OF MAKING THE SAME.

Application filed June 19, 1925. Serial No. 38,380.

My invention relates to cushion tires and it has for its primary object the provision of a process of manufacturing such tires which will result in securing desirable operating characteristics.

Heretofore it has been customary to make solid or cushion tires by extruding rubber stock in a tube mill through a die, to form sticks of tread material. It has been proposed to form the die of such shape that the resulting stick will have a cross-sectional area corresponding substantially to that desired for the finished tire.

To groove the stick, in order to form a cushion tire, it has been proposed to place a V-shaped cutting tool in the aperture of the die.

Sticks of tread material for solid cushion tires made in this manner are cut to the required length and cemented to a metal tire rim or base band, through the medium of a hard rubber strip. Soft rubber, from which the tread is made, does not adhere readily to metal. Hard rubber is inserted between the metal and the tread and adheres to both when the tire is vulcanized.

There are several phenomena occurring in this process which materially affect the finished product. They may be discussed and the present invention explained by reference to the accompanying drawings, wherein:

Fig. 1 is a cross-section of a tread stick extruded in the improved process;

Fig. 2 is a cross-section of a tread stick for a solid tire formed under the old process;

Fig. 3 is a cross-section of a tread stick for a cushion tire formed under the old process;

Fig. 4 is a cross-section of a tread stick for a cushion tire formed under the new process;

Fig. 5 is a fragmentary view taken on the line A—A of Fig. 1; and

Fig. 6 is a perspective view of a cutting tool employed in the new process.

One phenomenon which is observed in extruding sticks of plastic material is that of distortion. When rubber or other plastic material is extruded through a die, it must pass through an orifice of restricted diameter. After leaving the orifice, it may be said that the kinetic energy, created in the material by passage through the restricted orifice is transformed into potential energy, when the stick emerges into a zone of greater diameter. The resulting transformation of energy causes plastic material to expand in substantially a radial direction. Under certain operating conditions, it has been found that an extruded rubber stick will expand practically 100 percent, that is, the cross-sectional area of the stick after equilibrium is obtained is practically twice the cross-sectional area of the orifice. Maximum distortion occurs through the center of the stick. The expansion is not uniform, and as a result, the stick which has expanded will not have a cross-sectional area similar to that of the orifice.

It has been recognized that economy in manufacturing operations could be obtained by extruding tread material in the form of a double stick, and subsequently splitting the stick to form two treads. However, because of distortion, it has not been possible heretofore to develop a method which would yield a satisfactory stick. Recently a satisfactory method has been developed by which a double stick may be extruded and subsequently cut to form two tread sticks which are of the proper shape and size. This method does not form a part of the present invention and need not be referred to in detail. It is discussed in an application field by Jorgen I. Haase, dated June 19, 1925, S. N. 38,280.

A second phenomenon is that of grain effect. Plastic material extruded through a die has a definite grain. As shown in the drawings, the grain is concentric to the center of the stick. As shown in Fig. 5, the grain is conical. The grain effect in extruded rubber is somewhat analogous to that in a tree. Referring to the drawings, it will be seen that in Fig. 1 the grain is shown by the lines 10 concentric about the central axis of the stick. Fig. 2 is a section of a single stick which has been extruded from a die. Here again the grain is exhibited by a series of concentric circles around the center of the stick. Fig. 3 shows a section 3 of a cushion tire which has been extruded through a die having a V-shaped cutting tool. It will be noted here that the grain is distorted. The grain lines are continuous, form closed curves, and bend around the portion cut from the tire by the V-shaped cutting tool. It is to be particularly noted in Figs. 2 and 3 that the grain adjacent that portion of the tire which lies next to the hard rubber base band, as indicated at 11, lies either at an angle or parallel to this surface.

When treads having a grain, such as shown in Figs. 2 and 3, are vulcanized to a hard rubber base band, the union is not as firm as desired. This is because of the relation of the grain to the face adjacent the hard rubber band. If, however, a tread is made from material grained as shown by the half section 1 in Fig. 1, or by the section 4 in Fig. 4, the union between the tread and the hard rubber band is much stronger. This is because the grain is substantially normal to the surface of the band.

It has been found that a better union is obtained when the grain is substantially normal to the rim or base band.

The grain effect of the sections shown in Figs. 1 and 4 along the base 11 of the tread, is indicated in Fig. 5. Near the outer edges of the tire, the grain lines are substantially parallel to the side walls of the tire. The angularity of the grain lines increases toward the center of the tread. In the treads which have a grain according to Figs. 2 and 3, the back 11 of the tread does not show exactly the same structure. In Figs. 2 and 3, for example, where the contours 10 are substantially parallel to the back 11 of the tread, only a very slight effect will be observed.

There is one other phenomenon occurring in extruded stock. When unvulcanized soft rubber composition is warm from tubing, it may be cut readily. When cold, considerable effort is required to cut a groove through it. Advantage has been taken of the condition of the rubber when warm from tubing in the cutting process, disclosed in the copending application previously indicated. It is to be understood, of course, that the terms "warm", "hot" and "cold" are used in a relative sense. The stick as it emerges from the extruding machine is at a temperature of approximately 180° F. Between this temperature and about 100° F. it may be termed warm. Below that temperature, difficulty is experienced in the cutting operation, and it may be said to be cold. These temperatures are merely indicative, they vary with operating conditions and with the nature of stock employed. The plasticity of the material while warm may be used to advantage in the new method of forming a tread having a section such as shown in Fig. 4.

To form this section, stock is extruded in the form of a double stick having a cross-sectional area, after expansion, as shown in Fig. 1. The strip is then cut along the line A—A, according to the method set forth in the copending application. While still warm, a cutting tool, such as shown in Fig. 6, is pulled through the material to form the central groove 12, shown in Fig. 4. The cross-section then has a grain which is normal to the surface 11, and is not parallel as shown in Fig. 3.

The cutting tool, shown in Fig. 6, comprises a handle 5 having an enlarged head. A metal member 6 having a cutting edge 7 is bent to a shape substantially the same as that desired for the central groove 12. The metal knife 6 is secured to the handle 5 by suitable means, such as screws 8.

If the stock is cut after it becomes cold, a much stronger cutting tool would be required. While the structure shown in Fig. 4 can be obtained by cutting after the stock is cold, it is more desirable to cut while the stock is warm.

From the foregoing description it will be seen that a method has been developed for obtaining tire treads having greatly improved characteristics. As compared with tire treads made by the older methods the new treads have longer life and form a better union.

While this invention has been described as having particular utility in the manufacture of solid and cushion tires, it is to be understood that it is not limited thereto. The process is applicable to extrusion operations of materials designed for various uses. The invention should be limited only by the scope of the appended claims.

What I claim is:

1. A method of making cushion tires which comprises the steps of extruding a stick of plastic material, splitting the stick longitudinally and cutting a groove in the stick while it is at a relatively high temperature.

2. A method of making cushion tire treads which comprises the steps of extruding a stick of rubber which has a cross-sectional area of substantially twice the cross-sectional area of the tread, splitting the stick along a longitudinal axis and across the grain of the stick, and grooving out a central portion of the stick while the stick is still hot.

3. A cushion tire comprising a rim portion and a rubber tread portion formed with a cavity extending circumferentially thereof, the grain lines of the tread being substantially normal to the rim at the rim, and extending in substantially regular curves concentrically with respect to the contour of the cavity.

In witness whereof, I have hereunto signed my name.

RICHARD S. BURDETTE.